US006246669B1

United States Patent
Chevalier et al.

(10) Patent No.: US 6,246,669 B1
(45) Date of Patent: Jun. 12, 2001

(54) METHOD AND SYSTEM FOR OPTIMIZING CONNECTION SET-UP OPERATIONS IN A HIGH SPEED DIGITAL NETWORK

(75) Inventors: Denis Jean Albert Chevalier, La Colle sur Loup; Philippe Michel Bazot, Chemin de la Gaude Vence; Olivier Maurel, Le Cannet; Eric Levy-Abegnoli, Nice; Olivier Bertin, Eybens; Laurent Nicolas, Les Hameaux du Soleil Villeneuve Loubet; Jean-Paul Chobert, Saint Jeannet, all of (FR)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/193,301

(22) Filed: Nov. 17, 1998

(30) Foreign Application Priority Data

Nov. 28, 1997 (EP) .................................. 97480084

(51) Int. Cl.⁷ .................................................. H04L 12/46
(52) U.S. Cl. .......................... 370/238; 370/257; 370/400
(58) Field of Search .................................. 370/230, 235, 370/236, 238, 254, 255, 257, 400, 401, 410; 709/220, 221, 222, 238, 241, 242, 249

(56) References Cited

U.S. PATENT DOCUMENTS

| | | | |
|---|---|---|---|
| 4,922,486 | 5/1990 | Lidinsky et al. | 370/60 |
| 5,018,137 | 5/1991 | Backes et al. | 370/85.13 |
| 5,115,433 | 5/1992 | Baran et al. | 370/94.3 |
| 5,138,615 | 8/1992 | Lamport et al. | 370/94.3 |
| 5,150,360 | 9/1992 | Perlman et al. | 370/94.3 |
| 5,233,604 | 8/1993 | Ahmadi et al. | 370/60 |
| 5,265,092 | 11/1993 | Soloway et al. | 370/60 |
| 5,280,480 | 1/1994 | Pitt et al. | 370/85.13 |
| 5,329,527 | 7/1994 | Ujihashi et al. | 370/85.13 |
| 5,357,508 | 10/1994 | Le Boudec et al. | 370/58.3 |
| 5,394,402 | 2/1995 | Ross | 370/94.1 |
| 5,420,862 | 5/1995 | Perlman | 370/85.13 |
| 5,444,702 | 8/1995 | Burnett et al. | 370/60.1 |
| 5,490,139 | 2/1996 | Baker et al. | 370/60 |
| 5,491,690 | 2/1996 | Alfonsi et al. | 370/60 |
| 5,570,359 | 10/1996 | Nguyen | 370/60 |
| 5,577,033 | 11/1996 | Chang et al. | 370/60 |
| 5,581,552 | 12/1996 | Civanlar et al. | 370/396 |

(List continued on next page.)

OTHER PUBLICATIONS

IBM Technical Disclosure Bulletin, V37, #10, Oct. 1994, "Addressing Source Routing in an ATM Emulated LAN", pp. 75–80.

(List continued on next page.)

*Primary Examiner*—Ricky Ngo
(74) *Attorney, Agent, or Firm*—Cesari and McKenna, LLP; A. Sidney Johnston

(57) ABSTRACT

In a high speed digital network including access nodes and network nodes each having topology data bases, a method for optimizing the connection set-up operations required for connecting a calling end-user attached to a local access node to a destination user attached to a remote access node, via a conventional connection set-up operation. An Access Node Connection Table (ANCT) in each access node stores a list of every remote access node for which the local access node has at least one user connection. A field in the locate reply message is defined for the destination remote Access Node Topology Database (ANTDB) and remote ANTDB information is inserted prior to sending the reply message. Locate reply message reception is monitored by the local access node, and upon reception an entry is created for the received remote ANTDB information in the local access node unless the remote access node was already identified in the local access node. An optimal path is then selected and connection set up. The ANCT is then updated accordingly.

22 Claims, 13 Drawing Sheets

U.S. PATENT DOCUMENTS

| | | | |
|---|---|---|---|
| 5,590,118 | 12/1996 | Nederlof | 370/218 |
| 5,600,638 | 2/1997 | Bertin et al. | 370/351 |
| 5,600,644 | 2/1997 | Chang et al. | 370/404 |
| 5,606,669 | 2/1997 | Bertin et al. | 395/200.15 |
| 5,636,216 | 6/1997 | Fox et al. | 370/402 |
| 5,636,217 | 6/1997 | Moelard | 370/338 |
| 5,649,108 | 7/1997 | Spiegel | 395/200.12 |
| 5,687,167 | 11/1997 | Bertin et al. | 370/254 |
| 5,699,347 | 12/1997 | Callon | 370/238 |
| 5,719,863 * | 2/1998 | Hummel | 370/392 |
| 5,732,072 | 3/1998 | Thanner et al. | 370/255 |
| 5,740,171 | 4/1998 | Mazzola et al. | 370/392 |
| 5,764,636 | 6/1998 | Edsall | 370/401 |
| 5,790,808 | 8/1998 | Seaman | 395/200.53 |
| 5,805,593 | 9/1998 | Busche | 370/396 |
| 5,838,660 | 11/1998 | Crosin | 370/216 |
| 5,838,663 | 11/1998 | Elwalid et al. | 370/233 |
| 5,854,899 | 12/1998 | Callon et al. | 395/200.68 |
| 5,878,232 | 3/1999 | Marimuthu | 395/200.79 |
| 6,097,727 * | 8/2000 | Peters | 370/200 |
| 6,144,661 * | 11/2000 | Katsube et al. | 370/390 |
| 6,147,971 * | 11/2000 | Rochberger et al. | 370/238 |

OTHER PUBLICATIONS

IBM Technical Disclosure Bulletin, V39, #8, Aug. 1996, "Method for Improving Network Availability with Redundant Network Servers", pp. 195–196.

D. Delaney and M. Seaman, Single or Multiple Filtering Databases, May 8, 1997.

S. Horowitz, Dual–Layer Spanning Tree, (A Spanning Tree Proposal for IEEE 802.1Q), May 14, 1997.

Lucent Technologies Inc.'s Initial Disclosure of Prior Art Under civil Local Rule 16–7, U.S. District Court for the Northern District of California, C.A. No. C98–20836JW (PVT) ENE, Nov. 18, 1998.

M. Seaman, High Availability Spanning Tree, Rev. 1.1, Oct. 26, 1998.

J. Hart, Extending the IEEE 802.1 MAC Bridge Standard to Remote Bridges, IEEE Network, Jan. 1998, vol. 2, No. 1, pp. 10–15.

B. Yener, et al., *Fault–Tolerant Convergence Routing,* Copyright 1994 IEEE.

R. Perlman, *Interconnections: Bridges and Routers,* Copyright 1992 by Addison–Wesley Publishing Company, Inc., pp. 54–64.

IEEE P802.1d Draft Standard for Local Area Networks MAC (Media Access Control) Bridges: Technical and Editorial Corrections, Copyright 1997 IEEE, pp. 1–10, 85–122 and 151–158.

*Configureing VTP, VLANs, VLAN Trunks and VMPS,* Cisco Systems Inc., Published Jun. 9, 1998.

* cited by examiner

AN TOPOLOGY DATABASE

- AN TOPOLOGY DATABASE 600
  - TABLE OF ACCESS NODES 601
  - TABLE OF TRANSMISSION LINKS 602
    - LINK 3
    - LINK 2
    - LINK 1
      - 603 LINK PROPERTIES
      - 604 LINK STATE
      - 605 LINK RESERVED BANDWITH

FIG. 6

| REMOTE NODE NAME | CONNECTION USED TO SEND DATAGRAM | | CONNECTION COUNTER |
|---|---|---|---|
| | CX IDENTIFIER | CX PATH | |
| NODE 1 | C 1 | P 1 | 1 |
| NODE 2 | C 2 | P 2 | N |
| | | | |
| | | | |
| ⋮ | ⋮ | ⋮ | ⋮ |
| NODE N | C n | P n | X |

FIG. 12

METHOD AND SYSTEM FOR OPTIMIZING CONNECTION SET-UP OPERATIONS IN A HIGH SPEED DIGITAL NETWORK

FIELD OF INVENTION

The present invention deals with high speed packet switching networks and more particularly with a method and system for improving said network operation by enabling efficient path selection and connection set-up operations.

BACKGROUND OF THE INVENTION

A data communications network can generally be defined as a collection of network nodes and access nodes interconnected through communication links. A network node is generally a high cost data processing system that provides certain functions within the network, such as routing of messages (generally in the form of data packets) between itself and neighboring nodes, selection and optimization of routes for messages to be transmitted within the network and furnishing directory services to locate resources. Comparatively, access nodes are low cost data processing systems, offering to attached users a high level of access services but providing a limited set of routing, path selection and directory services. The links between nodes may be permanent communications links such as conventional cable connections or links that are enabled only when needed, such as dial-up connections through public or private telephone systems.

The number of access nodes in a network is expected to be much greater than the number of network nodes. Collectively, the network nodes, the access nodes and the links between the nodes are referred to as network resources. The physical configuration and characteristics of the network resources are said to be the topology of the network.

Route management is the network layer protocol that guides packets to their correct destination. Two aspects have to be considered:

1. determining what the route for a given connection shall be;
2. actually switching (routing) the packet within a node. This aspect is particularly critical in high speed packet switching networks since the switching element must be able to decide where to route an incoming packet in a very short portion of time.

There are many methods to route a packet through a network. A first method can be called "dynamic node by node routing". With this method there is no route determined when the connection is set up. This is due to the fact that there is no connection. Each packet is sent into the network with its full destination address imbedded in the header. Each node knows the current network topology and loading and is able to decide where and on which path the packet should be directed. This process, even if it can be very fast is a software based technique. It is very difficult to see how it could be efficiently implemented in hardware. Packet rates of millions per second are not likely to be achieved by this method very soon.

This is the reason why, for high speed packet switching networks, another method named "source routing" is chosen preferably. In the source routing method the originating node is responsible for calculating the route the packet must take through the network. A routing field is appended to every packet sent and that field is used by the intermediate nodes to direct the packet towards its destination. The sending node must either know the network topology or it must use some method (such as broadcasting) to find the optimal route. But once the route is determined, intermediate switches do not need to refer to any system tables or parameters to make the routing decision. Depending on whether the network is "connection oriented" or "connectionless", two techniques are used. The first one, used in connectionless networks, consists in appending a routing vector to every packet sent and that vector is used by intermediate nodes to route the packet towards its destination. A drawback of this technique is that the routing vector requires some storage and so constitutes an overhead. This overhead may become unacceptable for a high speed real time network. This is the reason why another technique named "label swapping" is regarded by many as an appropriate technique for supporting source routing in high speed networks. The label swapping is a particular implementation of the source routing method for connection oriented networks. Each packet sent on the link has a header which includes an arbitrary number (called label) identifying which logical connection this packet belongs to. In such networks the call setup and the resource reservation process requires first that a connection be requested from a calling source to a target destination, then a route should be defined and finally reserved. The connection request is specified by the user via a set of parameters including origin and destination address and data flow characteristics. The route determination is realized by the source node using its local routing topology database. And finally the route reservation is sent out in a special message along the nodes specified during the route determination process. That message signals the intermediate nodes to set up their connection tables and to reserve their resources to provide the service level required by the connection request. The connection is then said to be set up.

It shall be noticed that a good source routing mechanism in large and high speed packet switching networks supporting connection oriented routing mode implies some requirements in terms of performance and resource consumption which can be summarized as follows:

The source node (or the node providing calculation for the source node) must be able to decide where to route an incoming connection in a very short period of time (the computation must be rapid enough to compute an optimum path for each connection request); this is a major requirement.

The switching time in the intermediate nodes must be minimized (minimum processing time).

The network resources along the selected path must be optimized according to user criteria.

Control messages must be limited as much as possible to avoid overloading the network.

Route determination and topology maintenance within a network typically involve a rather complex collection of algorithms that work more or less independently and yet support each other by exchanging services or information. The complexity is due to a number of reasons. First, it requires coordination between all the nodes rather than just a pair of nodes. Second, the routing algorithm must cope with link and node failures, requiring redirection of traffic and updates of the databases maintained by the system. Third, to achieve performance, it may need to modify its routes when some areas within the network become congested.

The subject invention focuses on the way to generate and maintain routing-related information even in case of link and node failures to all access nodes within a network, while minimizing processing time and software and hardware required.

Different methods including the so-called flooding mechanism and spanning tree mechanism are used to broadcast and maintain routing information within a network. Let's examine first the flooding mechanism, then the use of a spanning tree. Then we shall take a look at the way IBM Advance Peer-to-Peer Networking architecture (APPN) has solved the route determination issue in a network composed of network nodes and access nodes.

As shown in FIG. 1A the flooding method operates as follows. The origin node (e.g. node A) sends its information in the form of a packet to its neighbors (the nodes to which it is directly connected with a link). The neighbors relay it to their neighbors, and so on, until the packet reaches all nodes in the network. Two additional rules are also observed, which limit the number of packet transmissions. First, a node will not relay the packet back to the node from which the packet was obtained. Second, a node will transmit the packet to its neighbors at most once. This can be ensured by including in the packet the identification(ID) number of the origin node, a sequence number, which is incremented with each new packet issued by the origin node. By storing the highest sequence number received for each origin node, and by not relaying packets with sequence numbers that are less than or equal to the one stored, a node can avoid transmitting the same packet more than once on each of its incident links. With these rules, the links do not have to preserve the order of packet transmissions; the sequence numbers can be used to recognize the correct order.

FIG. 1-A illustrates that the total number of packet transmissions per packet broadcast lies between L and 2L, where L is the number of bi-directional links of the network. It also shows the sequence of packet transmissions to that end (see numbered arrows), with each packet transmission time being assumed to be over one unit. This method is not very efficient.

Another method is based on the use of a spanning tree. A spanning tree is a connected subgraph of the network that includes all nodes and has no cycles. Broadcasting on a spanning tree is more communication efficient than flooding. It requires a total of only N−1 packet transmissions per packet broadcast, where N is the number of nodes in the network. This is illustrated in FIG. 1B showing a network built of nodes and a spanning tree interconnecting these nodes. The spanning tree connects every node without any loop. The spanning tree is represented by dashed lines.

In addition to the bandwidth efficiency, the spanning tree can be optimized to fulfill a preferred criteria such as: select highest bandwidth links, lower cost links, lower transit delay links, etc.

The main drawback of this method is the need to maintain and update the spanning tree in the face of topological changes. Therefore there is a need to keep up-date databases.

The performance that we can expect from such a mechanism is directly related to the number of network resources, i.e. nodes and links. For large networks this can become unacceptable, because of the amount of network control traffic that it might generate (it's very unlikely that a customer would accept that the bandwidth on a trunk is not fully dedicated for user connections). Also the topology database could be dramatically large.

Therefore it appears necessary to avoid replicating the routing information in all nodes of the network. This approach applies particularly well to the case of a network composed of both network nodes and access nodes while minimizing average set-up process.

The IBM Advanced Peer to Peer Networking architecture introduces the concept of network nodes and access nodes (also called end nodes). Network nodes provide route selection services, directory services, intermediate routing and management services to end/access nodes. Access nodes are simpler nodes, which primarily serve end users located at the boundary of the network. An access node does not provide any network service to other nodes and does not support route selection nor intermediate routing functions. An access node must select an APPN network node and request this network node to be its network node server. The APPN access node will use the directory and routing facilities of the network node to locate resources within the network and to establish connections with them. An interesting thing in this approach is the way in which the network topology is handled. APPN systems have two kinds of topology databases; the local topology database and the network topology database. Every APPN end node maintains a local topology database. Every APPN network node maintains a network topology database. Local and network topology databases are used for route calculation. The local topology database contains information on the local node's properties and on all the links attached to the node. The network topology database contains information on all network nodes in the APPN network and the transmission links between them, including information of the transmission links local to that node. It does not include information on access nodes. The network topology database is fully replicated at each network node using a flooding mechanism.

The computation of a route between access nodes or between an access node and network node requires routing information about the access node(s) which is not contained in the network topology but obtained directly from the access node(s), during the resource discovery phase of connection setup. Using network topology, desired class of service specified in the connection setup and routing information from the access nodes, a route selection process is able to find the optimal path within the network.

The method is illustrated with reference to FIG. 2 showing a simplified network. Four network nodes (NNA, NNB, NNC, NND) are interconnected. Additionally, there are two end access nodes (ENA and ENB) each connected to two network nodes. Suppose user X (herein also designated as calling or source end-user) attached to end node "ENA" requests a connection to end user Y (also designated as target or destination end user), then:

(1) a search request for a target Y is sent by "ENA" to its network node server "NNA" to locate station Y;

(2) assuming "NNA" has no idea of the target Y resource's location, "NNA" initiates a broadcast search into the network;

(3) the broadcast search from "NNA" is received by end node "ENB", the "owner" of user Y;

(4) "ENB" builds a locate reply message and sends it back to its network node server, in our example "NND";

(5) "NND" then adds to the locate reply message the local topology information for "ENB" that is "ENB", link information between "ENB" and "NND", and link information between "ENB" and "NNC";

(6) the locate reply message is finally sent back to "ENA".

Now ENA is able to request from its server network node "NNA" a route between ENA and ENB. It provides origin node name "ENA", destination node name "ENB" plus the local topology information for "ENA" and "ENB".

All the necessary information is now available to topology and routing services to compute the optimum route.

A drawback of this method is that the only way to use accurate topology information for a remote end node is to always request, at each connection setup, the directory services function to carry back the remote topology information prior to issuing the route request to topology and route services. This significantly increases the connection setup time.

OBJECTS OF THE INVENTION

One object of this invention is to propose a mechanism minimizing the overall connection set-up time in a high speed digital network including access nodes and network nodes.

Another object of this invention is to provide a method and system for optimizing global network resources such as network node memory required for connection set-up.

A further object of this invention is to provide a method and system to manage growing broadband networks which fulfill connection requirements in terms of bandwidth and quality of services specified while ensuring global network resources optimization.

These and other objects, characteristics and advantages of the invention shall be more readily apparent from the following description of a preferred embodiment made with reference to the accompanying drawings.

SUMMARY OF THE INVENTION

This invention provides an improved method and system for optimizing, in a high speed digital network including access nodes (AN) and network nodes (NN) both including topology data bases (TDB), the connection set-up operations required for connecting a calling end-user attached to a local access node to a destination user attached to a remote access node, via a conventional connection set-up operation including sending a locate request message through the network, and looking for a locate reply identifying the remote access node, and then selecting a path and setting the connection accordingly, the method including:

- defining in each access node a so-called Access Node Connection Table (ANCT) for storing therein a list including every remote AN for which there is at least one user connection with the considered access node, and identifying said connection;
- defining in the locate reply message format a field for the destination remote Access Node Topology DataBase (ANTDB) and inserting the remote ANTDB information therein prior to sending the reply message;
- monitoring the locate reply message reception within the considered local AN, and upon reception of the locate reply message, creating an entry for storing in the local AN the received remote ANTDB, unless the considered remote AN was already identified in the local AN; then,
- conventionally selecting the optimal path and setting the connection accordingly; and,
- updating the ANCT table to include predefined information relative to the new set-up path.

BRIEF DESCRIPTION OF DRAWINGS

FIG. 6 describes the Access Node Topology Database (ANTDB) structure.

FIG. 12 describes the Access Node Connection Table (ANCT).

DETAILED DESCRIPTION OF A PREFERRED EMBODIMENT OF THE INVENTION

The present invention is directed to large packet switching networks comprising a plurality of nodes interconnected with links within a communication system.

Figure 3:
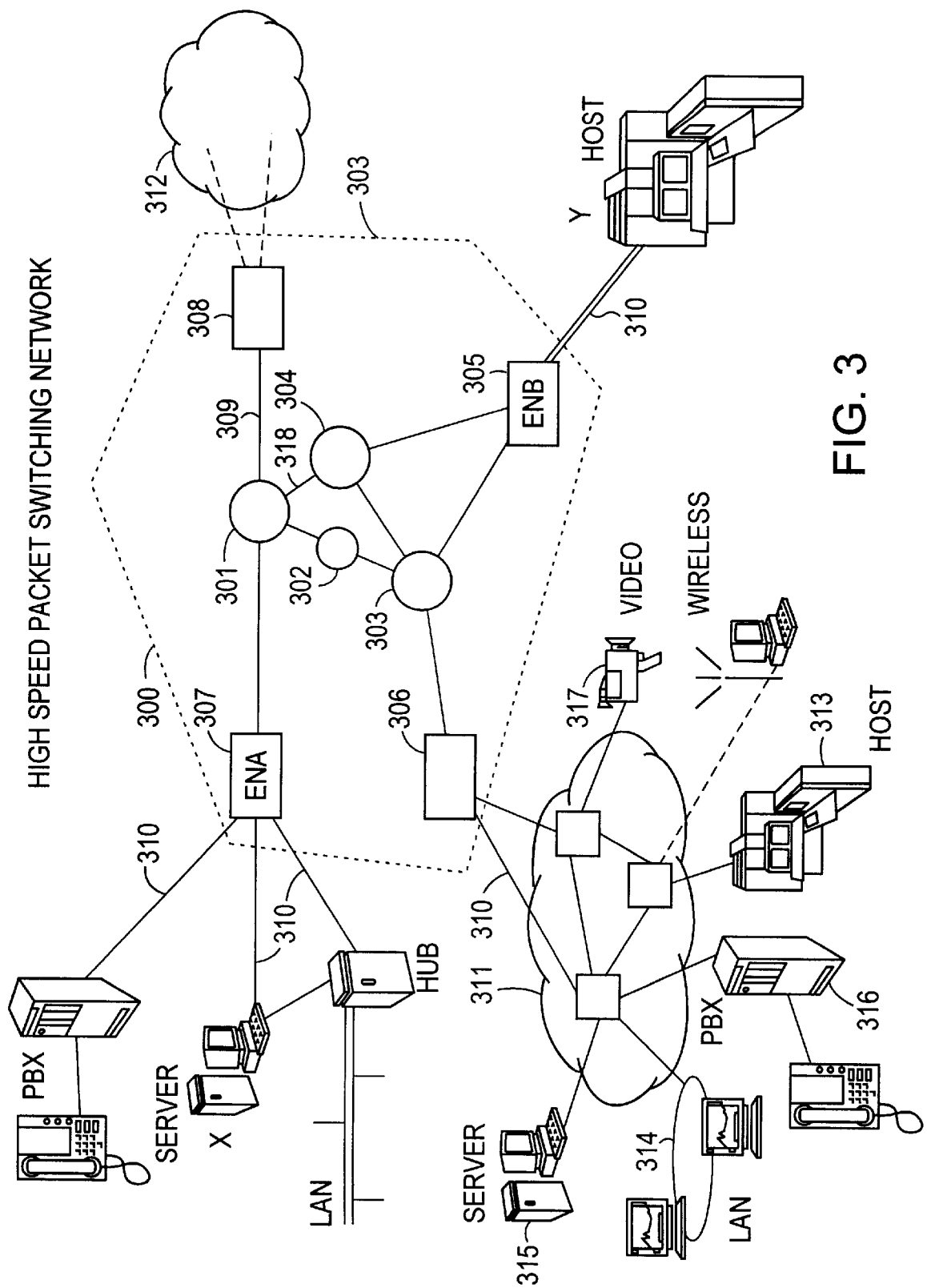
FIG. 3 shows a typical model of high speed packet switching network, including the access nodes and network nodes.

As illustrated in FIG. 3, a typical model of communication system is made of several user networks 312 communicating through a high performance network 300 using private lines, carrier provided services, or public data networks.

Each user network can be described as a set of communication processors and links interconnecting large computers used as enterprise servers 313, user groups using workstations or personal computers attached on LANs (Local Area Networks) 314, application servers 315, PBXs (Private Branch exchange) 316 or video servers 317. These user networks, dispersed in different establishments, need to be interconnected through wide area transport facilities and different approaches can be used for organizing the data transfer. Some architectures involve the checking for data integrity at each network node, thus slowing down the transmission. Others are essentially looking for a high speed data transfer and to that end the transmission, routing and switching techniques within the nodes are optimized to process the packets flowing towards their final destination at the highest possible rate.

The present invention belongs essentially to the latter category and more particularly to the fast packet switching network architecture detailed in the following paragraphs.

The general view in FIG. 3 shows a fast packet switching transmission system comprising eight nodes 301 to 308, each node being interconnected by means of high speed communication lines called trunks or links 309,318. Nodes 301 to 304 are network nodes (NN) and implement the backbone of the high speed network.

The access 310 to the high speed network by the users is realized through access nodes 305 to 308 located at the periphery of the high speed network. These access nodes comprise one or more ports, each one providing an access point for attaching external devices supporting standard interfaces to the network and performing the conversions required to transport the users' data flow across the network, from and to other external devices. For example, the access node 307 interfaces respectively a Private Branch exchange (PBX), an application server and a hub through three Ports and communicates through the network by means of the adjacent transit network node 301.

Network nodes 301 to 304 compose the backbone of the network. Each network node includes a routing point where the incoming data packets are selectively routed on the outgoing trunks towards the neighboring nodes. Such routing decisions are made according to the information contained in the header of the data packets. In addition to the basic packet routing function, the network nodes provide ancillary services, also named routing services, such as:

- determination of best routing paths for packets originated by the node, or by the adjacent access nodes,
- directory services like retrieving and updating information about network users and resources,
- maintenance of a consistent view of the physical network node topology, including link utilization information.

These routing services are accessed by adjacent access nodes when they require an optimal path within the network to process a connection setup.

The present description enforces the distinction between access nodes (AN), located at the periphery of the network, and network nodes (NN) composing the backbone of the network. On a practical view, it may happen that both resulting functions (access and routing) reside in the same physical node of the network. Yet, discrimination between ANs and NNs shall be used herein to clarify the description of this invention.

Figure 4:
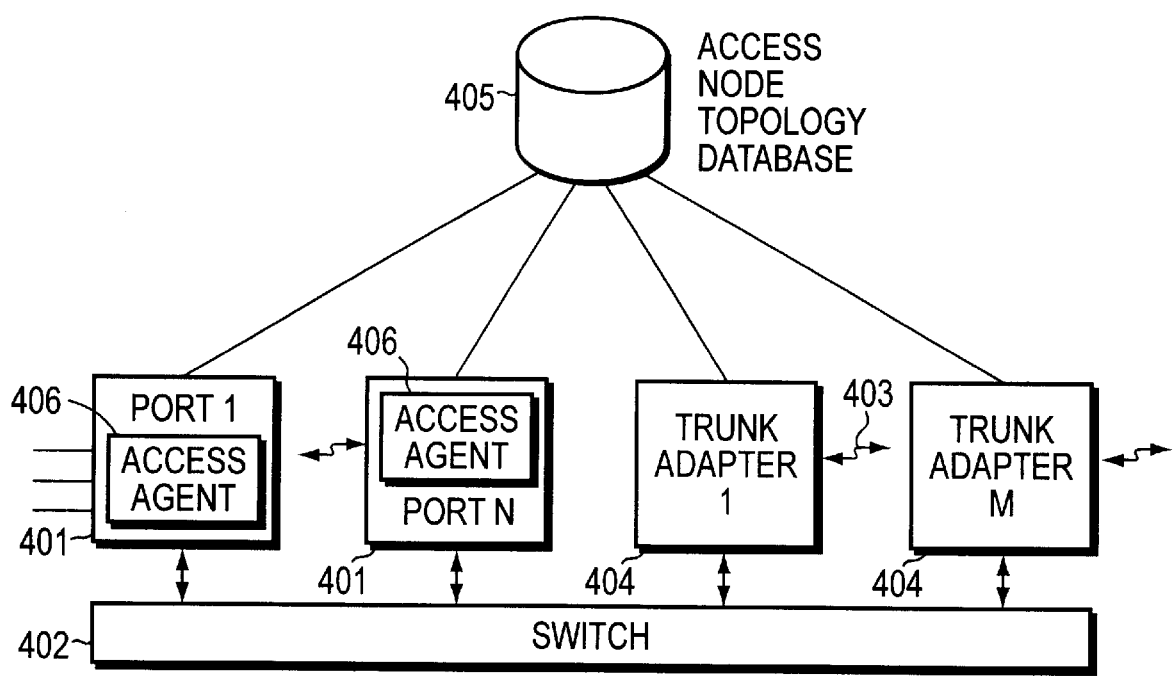
FIG. 4 describes a high speed access node structure.

FIG. 4 shows a general block diagram of a typical access node which may represent any of the nodes 305 to 308 (see FIG. 3). An Access Node comprises a high speed packet switch 402 onto which packets arriving at the access node are entered to be switched toward their respective destinations. Such packets are received from the network over transmission links 403 via trunk adapters 404, or from users via application adapters called ports 401.

An access node is attached to one or more network node(s) and may require access to a routing point by exchanging network control messages with the network node where the routing point resides, for the purpose of route determination within the network. When several adjacent network nodes are present an election mechanism ensures that only one network node is recognized as a routing point server at a given time, as illustrated with reference to FIG. 3 nodes 303, 304 and 305.

Network control messages use the same facilities as the user data traffic and are routed to the adjacent network node through the trunk adapters 404 and transmission links 403.

Each port 401 is connected to a plurality of user processing equipments, each user equipment comprising either a source of digital data to be transmitted to another system or data sink for consuming digital data received from another user system, or, typically, both.

The interpretation of the users' protocols, the translation of the users' data into packets formatted appropriately for their transmission on the packet network 400 and the generation of a header to route these packets are executed by an access agent 406 running in the port. This header is made up of control and routing fields. The routing fields contain all the information necessary to route the packet through the network 400 to the destination node to which it is addressed. The control fields include, among other things, an encoded identification of the protocol to be used in interpreting the routing field (source routing, label swapping, . . . ).

Computation of the routing information placed in the header is handled by the access agent that may require access to the routing point services running in the adjacent network node, by exchanging messages through the transmission links between the access node and the network node.

All the information necessary for the routing inside the access node is contained in the Access Node Topology Database ANTDB 405. Each transmission link attached to the access node is identified in the database and the associated information is updated when link state changes or when link load is modified significantly.

The Access Node Topology Database also contains routing information about remote access nodes. This invention addresses the mechanism used to acquire and maintain this information.

Figure 5:
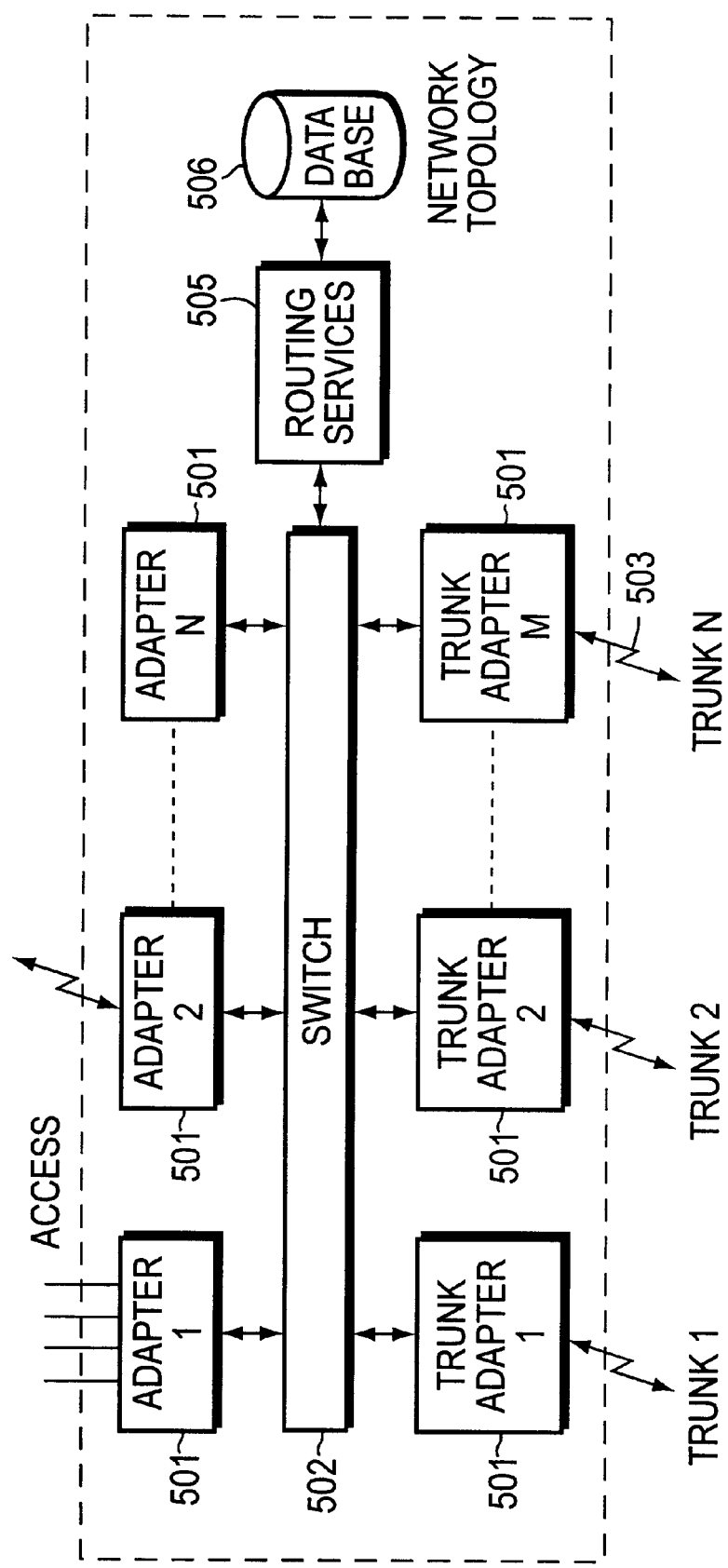
FIG. 5 describes a high speed network node structure.

FIG. 5 shows a general block diagram of a typical network node which may represent any of the nodes 301 to 304 of FIG. 3.

Using information in the packet header, the involved adapter 501 determines which packets are to be routed by means of the switch 502 and towards outgoing transmission link 503 leaving the node. The adapters 501 include queuing circuits for queuing packets prior to or subsequent to their launch on the switch 502. Queuing operations may have to take into consideration a number of predefined requirements such as so-called Quality of Service (QoS) and correlative priorities in organizing the traffic within the network.

The incoming transmission links to the Network Node may comprise links (trunks) from access nodes (AN) or links (trunks) from adjacent network nodes (NN). In any case, the network node operates in the same manner to receive each data packet and forward it to another node as dictated by the information in the packet header.

Figure 1:
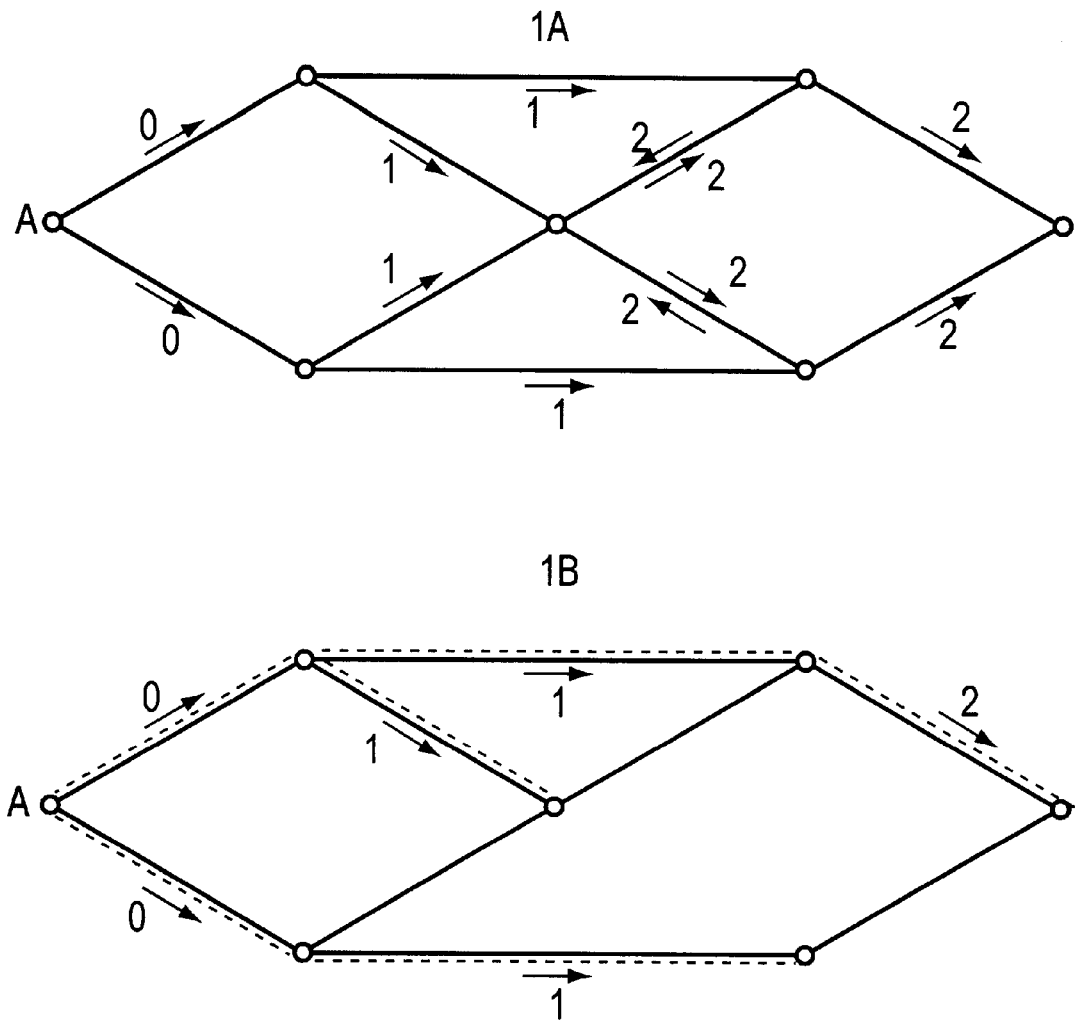
FIG. 1 shows an example application of prior art mechanisms used to broadcast and maintain routing information within a network.
Figure 2:
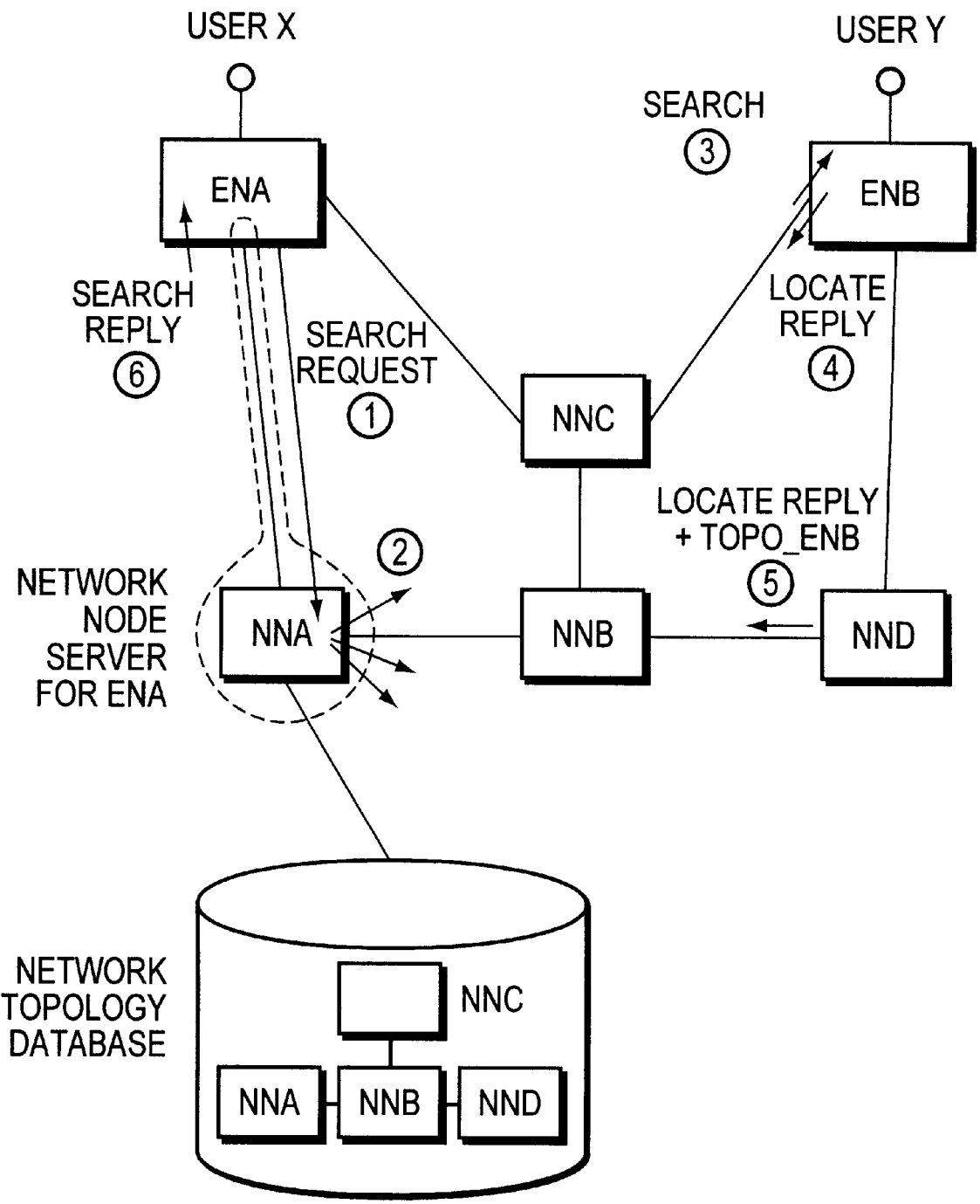
FIG. 2 describes the route selection process in APPN.

Routing services 505 required to control, allocate and manage the resources of the physical network are resident in the network node. A network node that provides routing services for an access node is named a network node server as mentioned with reference to FIG. 2. Upon request of the access nodes, these services are used to allow the establishment and the maintenance of the connections between user applications. The services include in particular:

- Directory services for locating and maintaining information about external users or resources.
- Path selection services for calculating the optimum path through the network 300 so as to satisfy a given set of quality of service specified by the user and to minimize the amount of network resources used to complete the communication path. The optimization criteria includes the number of intermediate nodes, the characteristics of the connection request, the capabilities and the utilization of the trunks in the path etc.
- Network topology maintenance services for maintaining all the information necessary for the routing, about the network nodes and the transmission links connected between the network nodes. This information is contained in a database.
- Network Node Topology Database NNTDB 506. The topology information is replicated in each network node. An algorithm guarantees the correctness of each node's topology database when links and nodes are added or deleted or when their characteristics change. The database contains:
  - the physical topology of the network backbone which includes static information like physical characteristics of network nodes and links,
  - the state of network node and links, and
  - the link utilization which includes dynamic characteristics like current bandwidth (used and reserved), real time measurements, etc.

Under steady state conditions, every routing point has the same view of the network.

- Congestion control service for enforcing the bandwidth reservation agreements between the network's users and the network management, which are established at the call setup time, and for estimating actual bandwidth and for adjusting reservation if necessary during the life of the connection.

Statistically speaking, in operation, in a fairly wide international network, any given access node is often connected to a sub-group of access nodes and very seldom, if ever, connected to the remaining access nodes. Consequently, maintaining full topology information in each network attached node, as is usually the case, lacks efficiency. This invention shall provide a specific protocol for both dynamically acquiring and maintaining access node topology to optimize network efficiency.

Each access node maintains its own Access Node Topology DataBase (ANTDB). The form of content of the ANTDB is quite similar to the content of the NNTDB but each ANTBD maintains topology information limited to the local access node itself and to each remote access node in communication with the local access node.

The general organization of the Access Node Topology Database is shown in FIG. 6. For each resource in the network, whether access node or transmission link, there is an associated entry in the database. This information is stored into related tables, e.g. Table of Access Nodes 601 and Table of Transmission Links 602, respectively.

A set of access functions allows the access node to create, modify or delete entries in the ANTDB. In a preferred embodiment, the nodes and links tables are implemented as hash tables with direct chaining as described in the publication entitled "Algorithms+Data Structures=Programs" from Niklaus Wirth, Prentice-Hall Inc.

Each link entry in the ANTDB includes the following characteristics:

the link physical properties 603 including:
transmission medium and speed,
routing mode supported,
maximum packet size,
link buffer capacity,
propagation delay,
bandwidth reservation supported;
the link state 604 including:
on-line (link can accept user connections),
quiescent (link cannot accept additional user connections, but existing connections continue),
off-line (link cannot accept user connections and existing connections are canceled);
the link utilization 605 including:
real time measurements,
reserved bandwidth.

Given the above mentioned facilities, a fairly efficient method is herein disclosed which enables creating and keeping up-to-date entries in the ANTDB without the drawbacks (e.g. excessive link bandwidth, as well as excessive processing load in the nodes, being required) introduced by known conventional mechanisms based on flooding or on the use of the spanning tree techniques. To that end, the present invention shall develop an Access Node Topology Datagram Protocol (ANTDP).

Prior to entering into the detailed implementation of the process, let's consider an example. Assume the invention is applied to end user X attached to a local end node ENA (e.g. server X attached to access node 307) requesting connection to end user Y attached to a remote and node ENB (e.g. Host Y attached to remote access node 305) (see FIG. 3). First, local access node (ENA) topology is created. Then, assuming user Y is unknown to end node ENA (i.e., Y not identified in local directory), a directory search is initiated through a specific locate message, and then a "reply" message is waited for. In this invention, the format of locate reply message shall not only provide the required data for locating user Y, but also provide ENA with full access node ENB topology information. Not only may the connection between X and Y then be established, with CXi being the identification of the connection X user; but also the original access node (ENA) generates an Access Node Connection Table (ACN) entry showing for ENB (i.e. access node to Y) the data selected for identifying the connection between X and Y.

To that end, the best mode of implementation of the invention has been made to include, defining the path for each connection identified (CXi): route and number of hops within the network. For instance with a label swapping type of operation for communicating data, the "route" information shall include labels. Also, if least cost routing is a selected criterion, the number of hops should be selected to minimize the communication cost for user X, like, for instance when minimizing the connection path length within a public backbone carrier network.

The access node maintenance procedure shall enable, in addition, periodically and for major changes, providing automatically, over the considered connection, the updating data required to maintain updated Access Node Connection Tables; e.g. ENA sends its access node topology table over CXi to ENB and conversely.

Now, should connection CX stop for any reason (e.g. for network failure, for instance), then conventional systems do include means for reestablishing the connection between users, possibly through a different network path. Then, according to this invention, the Access Nodes Connection Tables shall be automatically updated.

Finally, user X or Y may simply hang-up thus interrupting the connection. Then, according to this invention, should another path between ENA and ENB be active, the topology maintenance procedure should be reported to that operating connection; otherwise the involved Access Nodes Connection Tables data are deleted.

Knowing that, statistically speaking, access node operations are not constant over time, some access nodes of a large communication network also being called more often for connection set-up than others, and knowing further that access nodes are called by a limited number of other access nodes, the process of this invention does, indeed, optimize network operating load and cost.

Let's now disclose the detailed implementation of the access node entry creation and Topology Datagram Protocol (ANTDP), to enable a man skilled in the art to implement this invention without additional inventive effort being required on his part.

The general purpose of the Access Node Topology Datagram Protocol (ANTDP) is to create and maintain entries in the ANTDB. The ANTDP comprises 2 separate procedures. The first procedure allows for creation of entries while the second one allows for entries maintenance and deletion of entries.

The entry creation procedure comprises two processes, the first one being used to create an entry for the origin access node and the second one to create an entry for a remote access node as a result of a successful connection setup with a resource attached to the remote access node. For instance, referring back to the example of FIG. 2, assuming calling end-user X requests connection with user Y, then the origin (i.e., local) access node would be ENA with ENB being the remote access node.

The local access node entry creation process creates an entry for the local access node itself. In a preferred embodiment of the invention this procedure is called during access node initialization.

Figure 7:
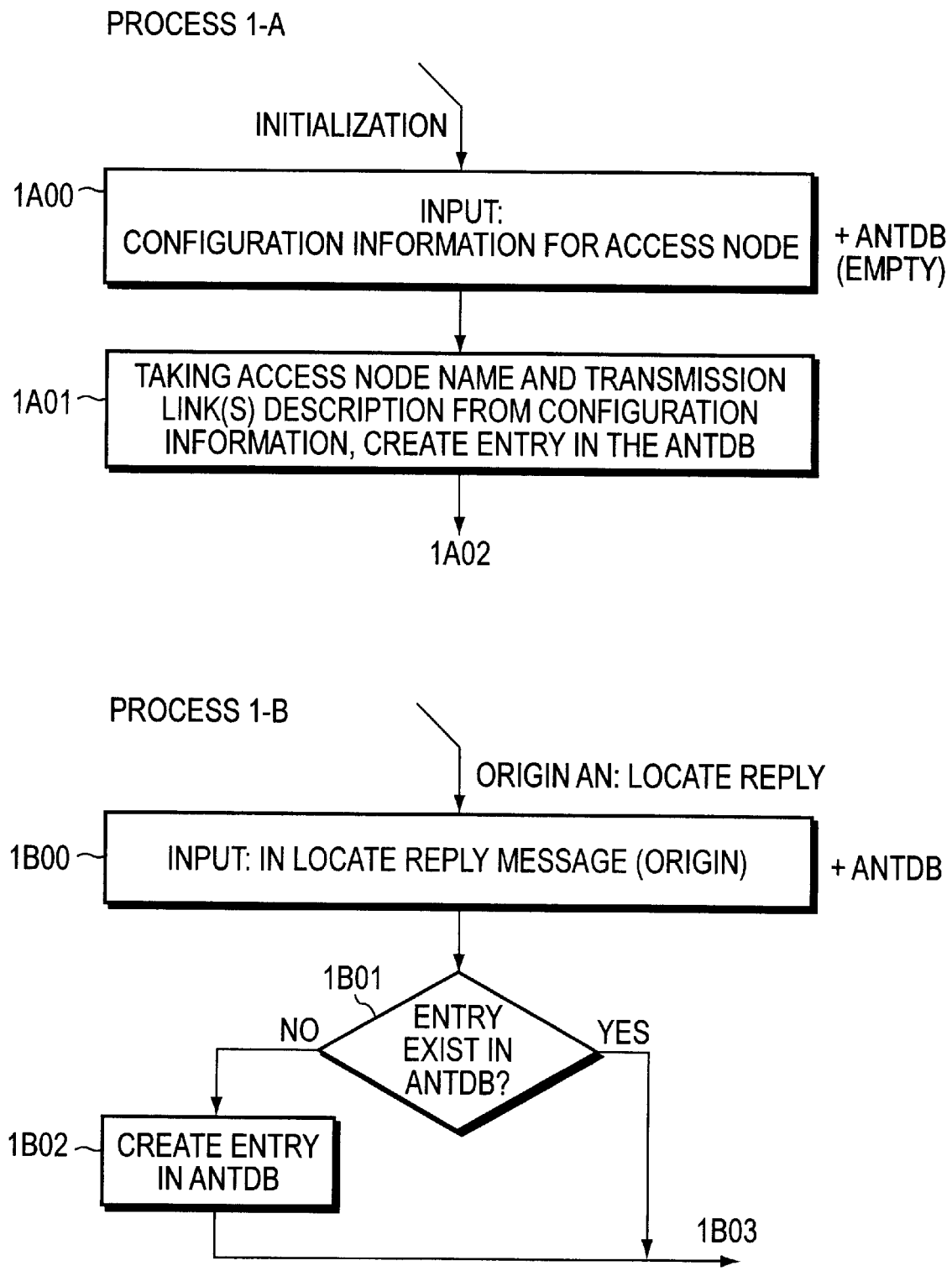
FIG. 7 shows a detailed flowchart of the entry creation procedure in the ANTDB according to the present invention.

FIG. 7, process 1-A shows a general flowchart of the "ANTDB local Access Node entry creation" process. Accordingly:

(1A00) Start of the process, (1A01) Taking information from access node configuration, the process creates an entry containing information as described with reference to FIG. 6 relating to "Access Node Topology DataBase". In particular access node name and description of each transmission link with the network node(s) is given.

(1A02) End of the process.

Then, the remote access node entry is created. This process is called during the connection setup phase and is described in FIG. 7, process 1-B. For any connection to be established, the location and characteristics of each resource (source and target) must first be known. A method for permitting an origin node to locate a target resource in a data communications network is described in U.S. Pat. No. 4,914,571 to Baratz et al issued Apr. 3, 1990. According to the teaching of this patent, an access node responsible for setting up a connection between a source resource and a target resource can perform a LOCATE search to dynamically locate the target and acquire needed information about the characteristics of the target.

Performing a LOCATE search in every instance of connection setup is not without disadvantages. Waiting for a full LOCATE search to be completed delays the establishment of connections. Moreover full LOCATE searches at each connection setup increase network traffic overhead since those searches take network time that could otherwise be devoted to the transfer of data between end users. This is the reason why many algorithms have been developed to allow an origin access node to maintain a cache directory. At each connection setup the originating access node searches its own cache directory for any entries relating to the target resource. If no entry is found, a LOCATE search is performed. If an entry is found, cached information is used and the connection setup process continues by performing the route selection process.

The present invention further improves that process to enable optimizing the network operation by minimizing the locate search traffic.

Figure 8:
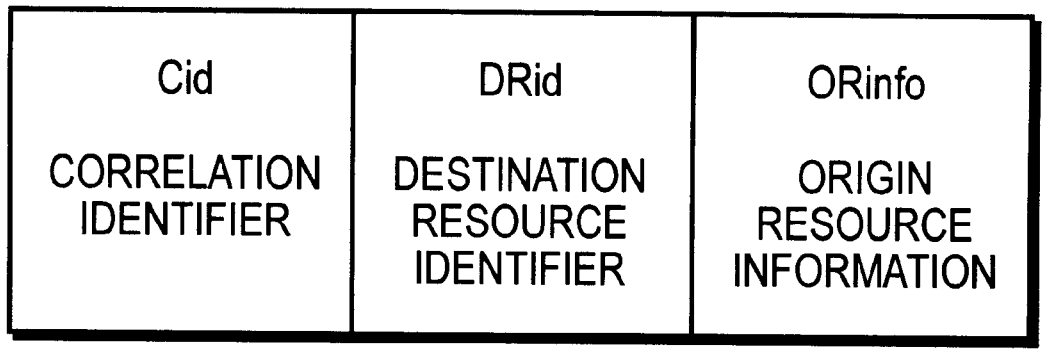
FIG. 8 shows a format of a LOCATE Request message used during the resource discovery phase of a connection setup.
Figure 9:
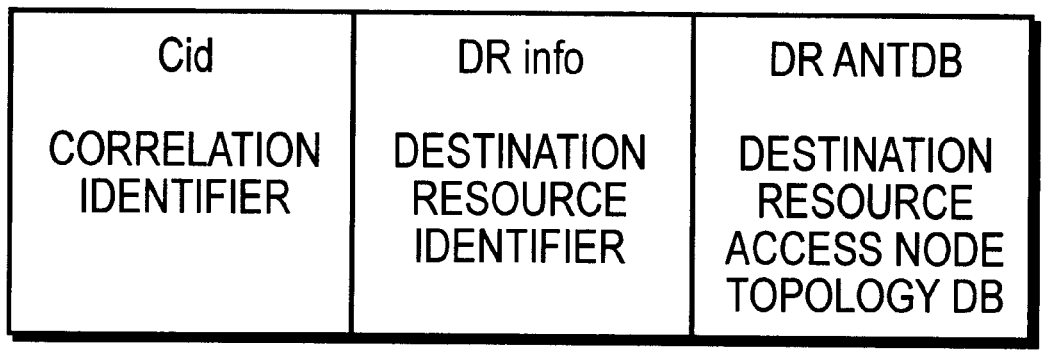
FIG. 9 shows a format of a LOCATE Reply message.

LOCATE operations are performed using LOCATE request and reply messages. A format for these messages is described in FIGS. 8 and 9, respectively. FIG. 8 represents a LOCATE request generated to search for a target resource. Assuming that the target resource is not at the same end node as the source resource, the LOCATE request is broadcast in the network and reaches the end node owning the target resource. A LOCATE reply is generated by the end node owning the target resource and returned to the originating access node. FIG. 9 represents a LOCATE reply format according to this invention. Field "Destination Resource (DR) ANTDB" is made to contain the local topology of the access node that the target resource (e.g. Y in the above cited example) is attached to, i.e., remote access node.

Upon reception of the LOCATE reply which triggers the process at the origin node, the local access node is now able to execute process 1-B described in FIG. 7.

(1B00) Start of the process (1B01) Using destination access node name contained in "DR ANTDB" field of the LOCATE reply verify that there is no matching entry in the local ANTDB. If a matching entry exists, the procedure is complete and terminates in stop step (1B03); otherwise, (1B02) Taking information contained in "DR ANTDB" field create an entry containing information as described in FIG. 6 "Access Node Topology Database". In particular access node name and description of each transmission link with the network node(s) is given. Then the process branches to (1B03) ending the process.

Accordingly, the originating access node now possesses the target resource location, its own local access node topology, and, the local topology of the access node "owning" the target resource.

It can now access the network node routing service located in its server network node to request a computation of an optimal path within the network and then proceed with connection set-up in a conventional manner.

Also, as already mentioned, the invention not only performs entry creation but also looks for maintaining those entries created in access nodes to optimize the network operations based on statistical considerations.

This is why, entry maintenance and entry deletion procedures are herein implemented. The purpose of these procedures is to maintain the access node topology information up to date once it is obtained as a result of the access node topology entry creation procedure described above. The originality is to distribute this topology information only to a subset of the network using a connectionless (datagram) service on top of already established users' connections rather than flooding every node in the network.

This procedure is made up of three processes to:

1. send the access node topology to the interested nodes (process 2-A),
2. receive the access node topology in the interested nodes (process 2-B),
3. keep a list of the interested nodes along with a path to reach them (process 3).

Figure 10:
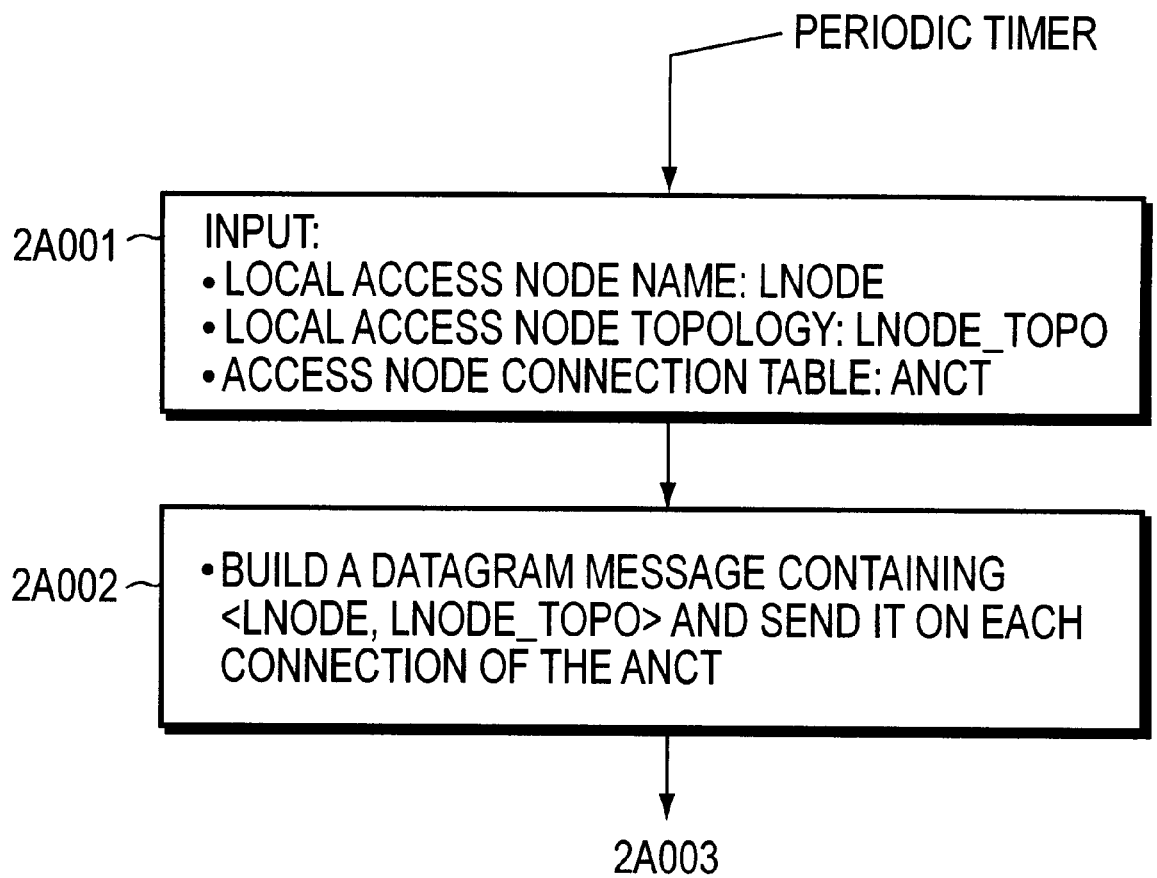
FIG. 10 shows a detailed flowchart of the "Sending AN Topology Procedure" according to the present invention.

The send process, according to flow-chart 2-A in FIG. 10 runs periodically in every access node to send topology data. In a preferred embodiment, it is triggered by a periodic timer which is empirically defined to take into consideration various parameters such as bandwidth, link characteristics, etc. This process is described in FIG. 10. It includes:

(2A001) Start of the process: the considered access node name is defined as LNode, the topology is LNode_topo and the Access Node Connection Table is defined as ANCT.

(2A002) The access node sends a datagram message containing its topology information to every node in its Access Node Connection Table (ANCT)(see process 3), i.e., belonging to set connection(s).

(2A003) End of the process.

Figure 11:
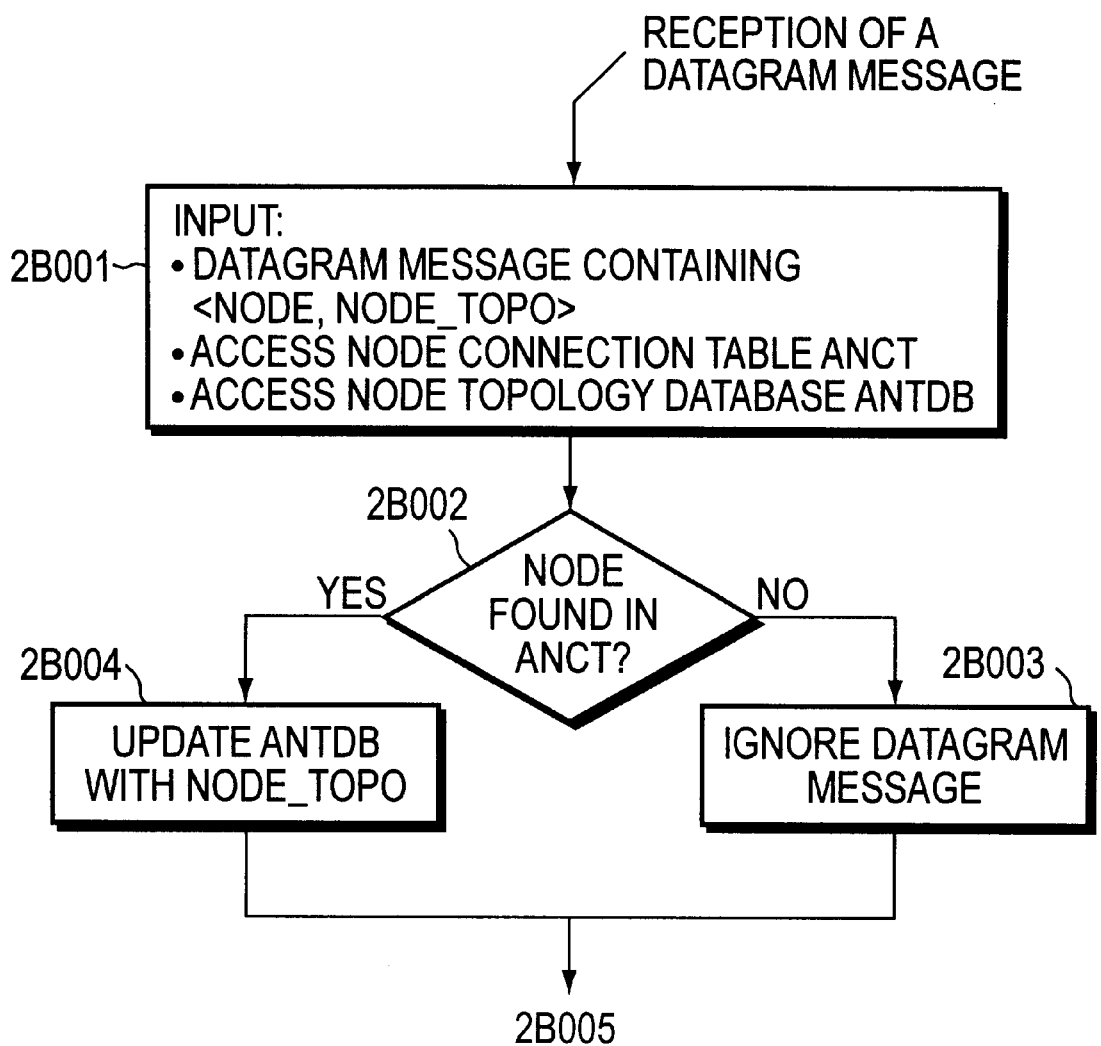
FIG. 11 shows a detailed flowchart of the "Receiving AN Topology Procedure" according to the present invention.

The receive process 2-B runs in every node receiving the message and is triggered by the reception of said access node topology message. The process is described in the flow-chart of FIG. 11. It includes:

(2B001) Start of the process.

(2B002) should the node be found in the local ANCT, it then updates the access node topology information according to the received message (2B004). But it may happen that the receiving node has no more connections with the sending access node and the sending ANCT has not yet been updated. As expressed by a negative answer to test (2B002), in that case, the datagram is merely ignored (2B003). Then, switch to:

(2B005) End of the process.

The periodical maintenance operations for access nodes topologies, i.e., updatings are much simplified due to the ANCT which is updated upon specific events as explained hereunder.

The Access Node Connection table (ANCT) structure as described in FIG. 12, contains the list of every node with which there is at least one user connection. For each such node, the table gives a path to be used to send datagrams to the node and a connection counter which records the number of connections between this node and the access node. In a preferred embodiment of the invention, access to this table is done using a hashing mechanism with node name as input key.

Two subprocesses are executed for ANCT update maintenance, one (3-A) at each successful connection establishment (connection set-up) the other (3-B) at each connection takedown. This is to enable optimizing the invention process and system.

Figure 13:
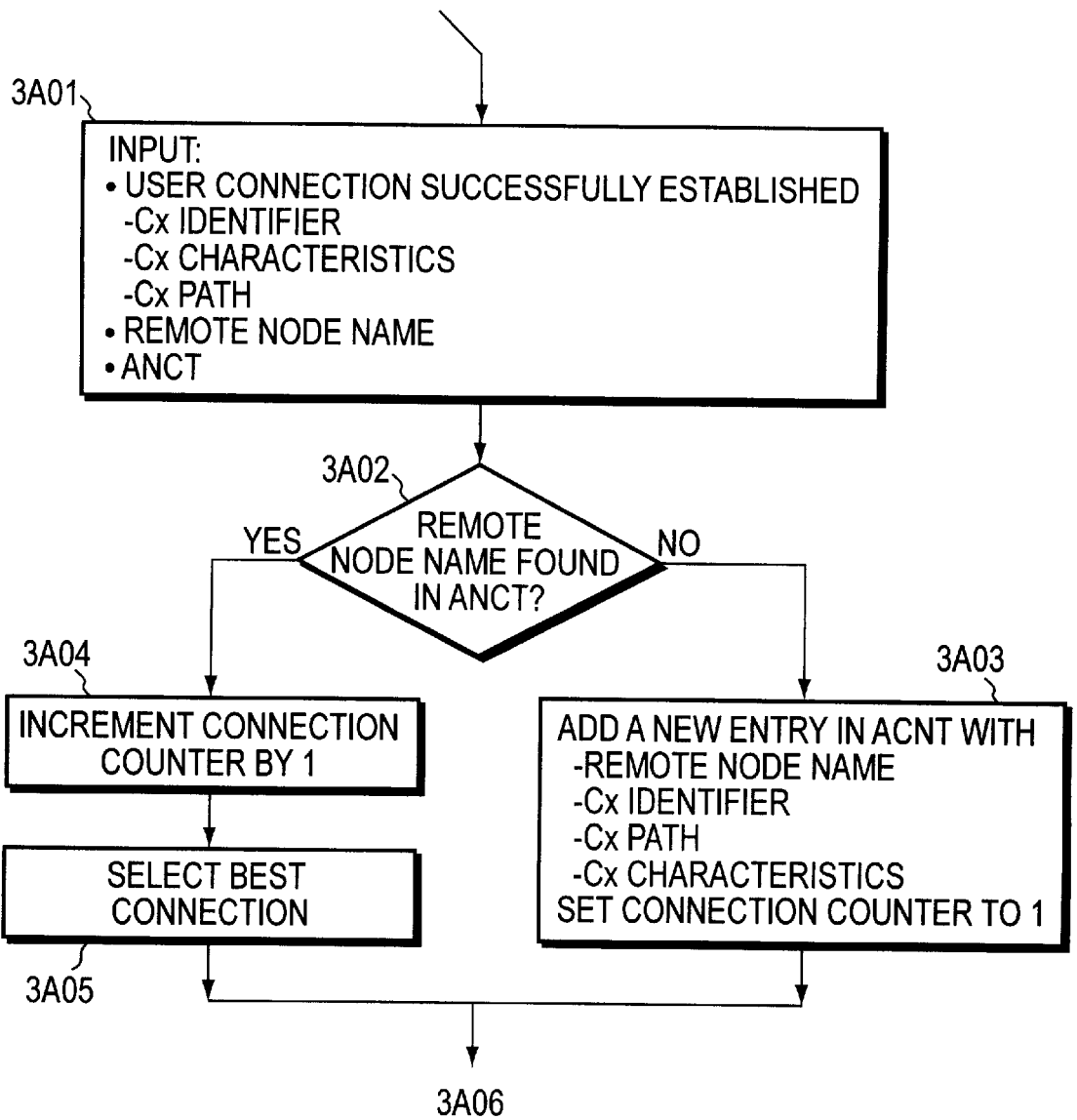
FIG. 13 and FIG. 14 show a detailed flowchart of the "ANCT table maintenance procedure" according to the present invention.

The subprocess 3-A is described in FIG. 13, accordingly:

(3A01) Each time a connection is successfully established, subprocess 3-A is entered. The connection (CX) is identified as well as its characteristics, the followed path, the remote node name and also the Access Node Connection Table (ANCT).

(3A02) The local access node checks if the remote node is already known in its connection table (ANCT).

(3A03) If not, the node name is added to the table along with the path to reach it (i.e. the connection is fully identified) and a connection counter is set to one.

If the node was already known, then:

(3A04) the connection counter is increased by 1; and then, (3A05) the best connection is selected for sending the datagram messages. In fact, one may keep the previous path as is or decide to update this entry to use the new path provided with new set-up connection, even if the source and destination nodes are identical in order to optimize the system operations. For one preferred embodiment, the new path is always chosen if its number of hops is lower than the number of hops on the path currently elected in the ANCT table. Other selection criteria could have been used to select a path in the access node, for instance:

always keep the first path until it becomes inoperative;

always take the new path;

always take the path with the highest bandwidth available.

(3A06) The process ends.

Figure 14:
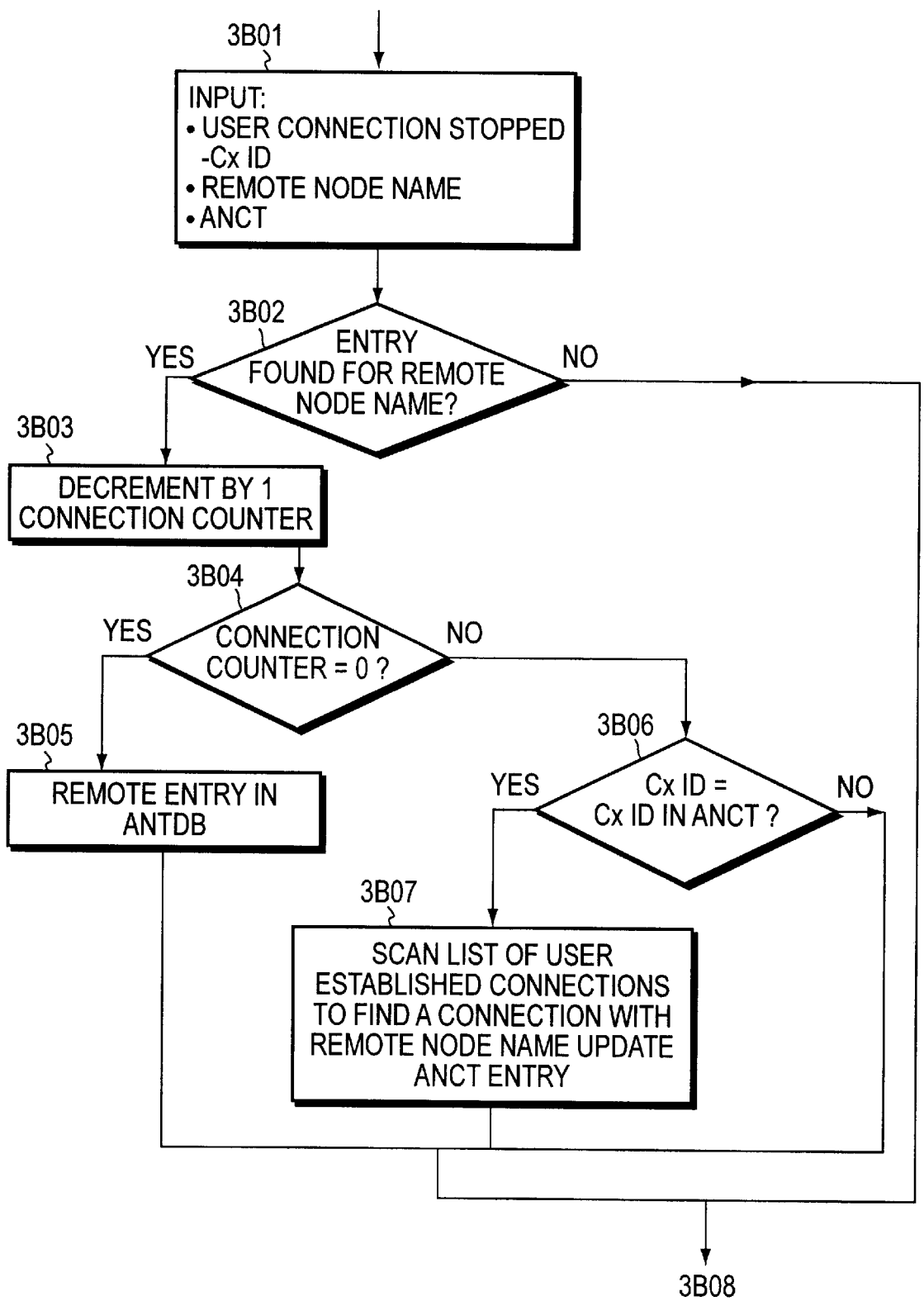

The subprocess 3-B is run after connection takedown. It is described in the flow-chart of FIG. 14. Accordingly:

(3B01) Each time a connection, as identified by its "id" is terminated, subprocess 3-B is entered;

(3B02) A search is done in the ANCT for a matching entry, given remote node name. If no entry is found the process 3-B is terminated (go to 3B08); otherwise, if an entry is found;

(3B03) the Access Node updates the connection counter by decrementing said counter by one unit;

(3B04) a checking is done on the connection counter value:

(3B05) when the counter reaches 0, the entry is removed from the ANCT and the entry in the ANTDB corresponding to the remote node is also removed, then the process ends by branching to 3B08, otherwise it goes to (3B06), (3B06) if the content of connection counter is different from 0, a check is done on the connection identifier to determine if the connection that is being stopped is the connection that was chosen to send datagrams;

if not, the process is terminated and branches to (3B08); otherwise it branches to (3B07), (3B07) since the connection counter value is different from 0 another user connection with remote node name exists. A search is done in the list of established connections to find that connection. ANCT entry is updated with new connection information; then the process branches to (3B08).

(3B08) End of process.

To show the advantages provided by this proposal an example has been chosen.

The network model is hierarchical, and is composed of:

A core network, including networks nodes which are fairly well meshed by high speed trunks. We assume 4 trunks on the average per node in the core. The speed of the trunks in the core network is always larger or equal to conventional E1 link speed.

An access network, including access nodes which are connected to the core network through a few links (typically 2 links per access node). The speed of the access links is generally E1, but can be sub-E1 and as small as 64 kbBps.

The network roll-out is as follows:

| | Network roll-out | |
|---|---|---|
| Number of nodes | First stage | Final stage |
| Core network (network nodes) | 135 | 275 |
| Access network (access nodes) | 400 | 1500 |

In case we apply the previous art, using a spanning tree to interconnect all network nodes and access nodes, the amount of control traffic corresponding to the update of the link utilization information in all topology databases of the network would be (with "×" standing for multiplication):

(Total Nb of network links)×(size of a Topology Database Update message (TDU))×(TDU frequency).

This traffic being broadcast through the network on the spanning tree, the aggregate load for the network is:

(Total TDU traffic)×(Total nb of nodes−1)

As already mentioned, the spanning tree is a minimal broadcasting tree which connects all the nodes of the network by using a minimum number of links. A characteristic of the spanning tree is that the number of links used for a network of N nodes is (N−1).

Numerical application:

Total number (nb) of network trunks: (nb of network nodes×4)+(Nb of access nodes×2). Thus 1340 trunks for first stage network and 4100 trunks for final stage network.

Total nb of network unidirectional links: (total Nb of network trunks)×2. Thus 2680 for first stage network and 8200 for final stage network.

Size of a Topology Database Update message: 300 bytes.

TDU transmit (xmit) frequency for each link: 1 message each 5 mn thus 1/300s

Aggregate resulting TDU traffic having to be supported by each network trunk on the spanning tree:

21.44 Kbps (first stage)

65.60 Kbps (final stage)

Aggregate load for the network (core network and access network)

11.45 Mbps (first stage)

116.37 Mbps (final stage)

Conclusion:

In the first stage the low speed trunks (64 Kbps) of the access network would already have 30% of their bandwidth dedicated to the TDU traffic 64 Kbps (21.4 Kbps vs 64 Kbps).

In the final stage the low speed trunks (64 Kbps) of the access network would be insufficient to support the TDU traffic (65.6 Kbps vs 64 Kbps).

In the final stage the aggregate TDU traffic load for the network is very important (116 Mbps) and unacceptable (wasting too much network resources).

In the case the proposed invention approach is applied, the broadcast of the Topology Database Update messages on the spanning tree is limited to the core network and the resulting traffic will be:

(Nb of links in the core network)×(size of a TDU msg)× (TDU xmit freq.)

This traffic being broadcast through the core network on the spanning tree, the aggregate load for the core network is:

(Total TDU traffic on core network)×(Total nb of nodes in the core −1)

Numerical application:

Total nb of links in the core network: 1080 first stage, 2200 final stage

Size of a Topology Database Update message: 2400 bits

TDU xmit frequency for each link: 1 msg each 5 mn thus 1/300s

Aggregate resulting TDU traffic on the spanning tree of the core network:

8.64 Kbps (first stage)

17.60 Kbps (final stage)

Aggregate load for the core network:

1.58 Mbps (first stage)

4.82 Mbps (final stage)

In addition one must add the TDU traffic generated by the access nodes. The assumption being that an access node sets up connections with 20% of the other access nodes, the point to point TDU traffic generated by this access node will be:

(20% of total nb of access nodes)×(size of a TDU)×(TDU xmit frequency)

To get the aggregate inter-access node TDU traffic, we just have to multiply the above formula by the total number of access nodes.

Numerical application:

20% of total nb of access nodes: 80 for first stage, 300 for final stage.

Size of a Topology Database Update message: 300 Bytes

TDU xmit frequency for each link: 1 msg each 5 mn thus 1/300s

Aggregate resulting TDU traffic having to be supported by each network trunk on the access network:

640 Kbps for first stage 2.4 Kbps for final stage

Intra-access node resulting aggregate TDU traffic:

256 Kbps for first stage 3.6 Mbps for final stage

The intra-access node aggregate TDU traffic flowing through the core network (no access node to access node direct access), the aggregate resulting load on the core network corresponds to:

(load of TDUs broadcast on spanning tree)+(intra-access node TDU traffic)

Numerical application:

1.58 Mbps+256 Kbps=1.83 Mbps for first stage 4.82 Mbps+3.6 Mbps=8.42 Mbps for final stage Conclusion:

The load for low speed trunks on access network remains very low (2.4 Kbps in final stage) and perfectly acceptable. The aggregate load on the core network due to TDUs traffic is drastically reduced (divided by a factor 13 in final stage) and becomes also acceptable. These numerical examples show the very usefulness of the invention process which obviously improves the high speed network efficiency by enabling optimized network operation.

What is claimed is:

1. In a high speed digital network including a plurality of access nodes and a plurality of network nodes each access node and network node including a topology data base, a method for optimizing the operations required for connecting a calling end-user attached to the network through a local access node to a destination end-user attached to the network through a remote access node, via a connection set-up operation including first determining if the remote access node is identified in the local access node, otherwise, sending a locate request message through the network and waiting for a locate reply to identify the remote access node, and then selecting a path and setting the connection accordingly, said method including:

defining in each access node an Access Node Connection Table (ANCT) for storing therein a list including every remote access node for which there is at least one user connection with said each local access node, and identifying said connection;

defining in the locate reply message format a field for the destination remote Access Node Topology Database (ANTDB) and inserting said remote ANTDB information therein, prior to sending said reply message;

monitoring said locate reply message reception within the local access node, and upon reception of said locate reply message, creating an entry for storing in said local access node the received remote ANTDB, unless the remote access node was already identified in the local access node;

conventionally selecting said optimal path and setting the connection accordingly; and updating the ANCT table to include predefined information relative to the set-up path.

2. A method for optimizing the operation of a high speed digital network according to claim 1, wherein said ANCT includes, for each remote access node connected to the local access node, the path to be used to send messages to the remote access node and a connection counter recording the number of connections set between said each remote access node and said local access node.

3. A method for optimizing the operation of a high speed digital network according to claim 1 further including:

running, upon predefined events occurring, a process for maintaining the local access node topology information, said predefined process being organized to distribute the topology information based on the ANCT information, using a connectionless datagram service on top of the already established user connection.

4. A method for optimizing the operation of a high speed digital network according to claim 3 and wherein said process for maintaining each local access node topology information includes:

running periodically in said each local access node a send process for sending an access node topology message containing said each local access node topology information to every node listed in said each local access node ANCT;

running in each access node a receive process triggered by the reception of said access node topology message to determine whether a connection still exists between said sending and receiving access nodes, and in case of a positive determination, updating the receiving ANTDB information accordingly.

5. A method for optimizing the operation of a high speed digital network according to claim 4 wherein said periodicity for running said predefined process for maintaining each local access node topology information is empirically defined to take into consideration various network operation parameters including assigned bandwidth and network link characteristics.

6. A method for optimizing the operation of a high speed digital network according to claim 5 further including a process for maintaining the ANCT information, in every access node at each connection set-up or termination.

7. A method for optimizing the operation of a high speed digital network according to claim 6 wherein said process for maintaining local ANCT information each time a connection is set-up includes:

determining whether the remote access node is already identified in the local ANCT, and should this test be negative, then adding the remote access node name to the ANCT along with the path to reach said remote access node, and setting the corresponding connection counter to "1"; otherwise, should the test be positive, increasing the corresponding connection counter content by one unit.

8. A method for optimizing the operation of a high speed digital network according to claim 7 further including, in case of a positive check to the considered test, updating the ANCT to select a new path for said connectionless datagrams.

9. A method for optimizing the operation of a high speed digital network according to claim 8 wherein said new path is selected for minimizing the number of hops.

10. A method for optimizing the operation of a high speed digital network according to claim 9 wherein said new path is selected according to the highest link bandwidth available.

11. A method for optimizing the operation of a high speed digital network according to claim 6 wherein said process for maintaining local ANCT information in case of a connection being terminated includes:

searching in the ANCT for a matching entry between the sending and receiving access nodes, and in case no such entry is found, stopping the process; otherwise, decrementing the corresponding counter by one unit and checking said counter content; and, if said counter content is zero, then, removing the entry from the ANCT as well as removing, in the ANTDB, the entry corresponding to the remote access node;

if said counter content is different from zero, then determining if the considered connection was the one chosen to send datagrams; if not, the process ends, otherwise, performing a search in the ANCT listed established connections for selecting a new connection and updating the ANCT accordingly.

12. In a high speed digital network including a plurality of access nodes and a plurality of network nodes each access node and network node including a topology data base, a system for optimizing the operations required for connecting a calling end-user attached to the network through a local access node to a destination end-user attached to the network through a remote access node, via a connection set-up operation including first determining if the remote access node is identified in the local access node, otherwise, sending a locate request message through the network and waiting for a locate reply to identify the remote access node, and then selecting a path and setting the connection accordingly, said system comprising:

means for defining and storing in each local access node an Access Node Connection Table (ANCT) for storing therein a list including every remote access node for which there is at least one user connection with said each local access node, said list identifying each said user connection;

means for defining in the locate reply message format a field for the destination remote Access Node Topology Database (ANTDB) and inserting said remote ANTDB information therein, prior to said reply message being sent;

means for monitoring said locate reply message reception within the local access node, and responsive to reception of said locate reply message, means for creating an entry for storing in said local access node the received remote ANTDB information, if said remote access node was not already identified in the local access node;

means for selecting said optimal path and setting the connection accordingly; and means for updating the ANCT table to include predefined information relative to the set-up path.

13. A system for optimizing the operation of a high speed digital network according to claim 12, wherein said ANCT includes, for each remote access node connected to the local access node, the path to be used to send messages to the remote access node and a connection counter recording the number of connections set between said each remote access node and said local access node.

14. A system for optimizing the operation of a high speed digital network according to claim 12 further including: means for maintaining the local access node topology information, wherein a connectionless datagram service is used on top of the already established user connection to distribute the topology information based on the ANCT information.

15. A system for optimizing the operation of a high speed digital network according to claim 14 wherein said means for maintaining each local access node topology information includes:

means for periodically sending an access node topology message containing said each local access node topology information to every node listed in said each local access node ANCT;

means, triggered by the reception of said access node topology message, for determining whether a connection still exists between said sending and receiving access nodes and updating the receiving ANTDB information accordingly.

16. A system for optimizing the operation of a high speed digital network according to claim 15 wherein said periodicity for sending local access node topology information is empirically defined to take into consideration various network operation parameters including assigned bandwidth and network link characteristics.

17. A system for optimizing the operation of a high speed digital network according to claim 16 further including means for maintaining the ANCT information in every access node at each connection set-up or termination.

18. A system for optimizing the operation of a high speed digital network according to claim 17 wherein said means for maintaining local ANCT information each time a connection is set-up includes:
   means for determining whether the remote access node is identified in the local ANCT;
   means for adding the remote access node name to the ANCT along with the path to reach said remote access node, and setting the corresponding connection counter to "1" if the remote access node is not identified in the ANCT; and
   means for increasing the corresponding connection counter content by one unit if the remote access node is identified in the ANCT.

19. A system for optimizing the operation of a high speed digital network according to claim 18 further including, in case of a positive check to the determining test, means for updating the ANCT to select a new path for said connectionless datagrams.

20. A system for optimizing the operation of a high speed digital network according to claim 19 wherein said means for selecting a new path selects the new path to minimize the number of hops.

21. A system for optimizing the operation of a high speed digital network according to claim 20 wherein said means for selecting a new path selects the new path according to the highest link bandwidth available.

22. A system for optimizing the operation of a high speed digital network according to claim 16 wherein said means for maintaining local ANCT information in case of a connection being terminated includes:
   means for searching in the ANCT for a matching entry between the sending and receiving access nodes;
   means for decrementing the corresponding counter by one unit and checking said counter content if said matching entry exists; and,
   if said counter content is zero, means for removing the entry from the ANCT as well as removing, in the ANTDB, the entry corresponding to the remote access node;
   if said counter content is different from zero, means for determining if the considered connection was the one chosen to send datagrams; and
   performing a search in the ANCT listed established connections for selecting a new connection and updating the ANCT accordingly.

* * * * *